June 4, 1957  R. FRANK  2,794,928
VOLTAGE COMPARISON MEANS
Filed Oct. 13, 1949  2 Sheets-Sheet 1

INVENTOR
ROBERT FRANK
BY
ATTORNEY

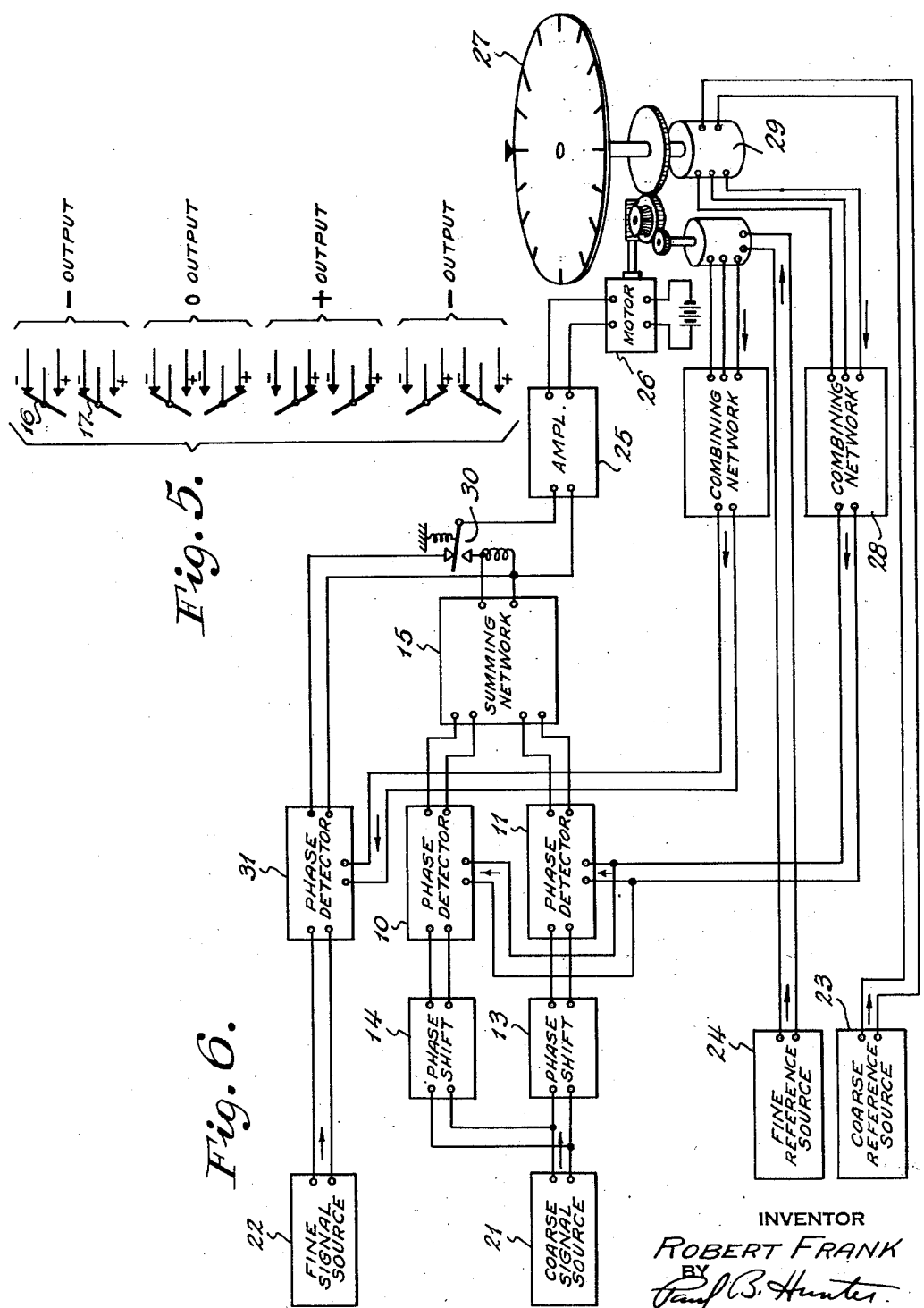

United States Patent Office 2,794,928
Patented June 4, 1957

2,794,928

VOLTAGE COMPARISON MEANS

Robert Frank, New York, N. Y., assignor to Sperry Rand Corporation, a corporation of Delaware Application October 13, 1949, Serial No. 121,189

6 Claims. (Cl. 307—149)

The present invention relates to voltage discriminator apparatus and more particularly to an improved combination of discriminators.

An object of the invention is to provide improved phase comparators having an output characteristic with a broad accurately defined null.

Another object of the invention is to provide discriminator apparatus having an output characteristic with a broad accurately defined null, and a second sharp narrow null, to avoid ambiguity as to said nulls.

Another object of the invention is to provide discriminator apparatus for data transmission systems of the coarse and fine type.

Another object of the invention is to provide improved discriminator apparatus for providing a positive or negative output, suitable for driving a servomechanism.

Another object of the present invention is to provide phase comparison equipment which will operate unambiguously for 360° of phase displacement.

Another object of the present invention is to minimize the amplitude sensitivity of phase detectors.

The present invention is directed primarily to means for combining conventional discriminators or detectors to provide an over-all operating characteristic having a broad accurately defined null. The invention is not limited to phase discriminators but may be also used in connection with conventional frequency discriminators as well as time discriminators, for instance of the type used to measure the time between pulses.

The present invention considered generally uses a pair of conventional discriminators, of the type having a slanting characteristic, connected in parallel. The input reference and signal to the parallel discriminators are then relatively displaced in some respect either phase, frequency or time, and the separate outputs of the discriminators are selected as to polarity and combined. The combined characteristic has a broad null having each limit defined by a null of one of the individual discriminators.

A characteristic of this type is advantageous in some applications, for example, measurement systems of the coarse and fine type or measurement systems in general where it is desired to select voltages within an accurately defined range, and to appropriately indicate voltages outside the high or low limits of this range. The discriminators illustrated and discussed in the present specification are phase detectors, but the invention is not so limited, as other discriminators such as frequency or pulse time discriminators may be used. Other types of polarity responsive devices may be used as combining means.

These and other objects of the invention will be more fully understood when considered in conjunction with the following specification and figures of which:

Figure 4:
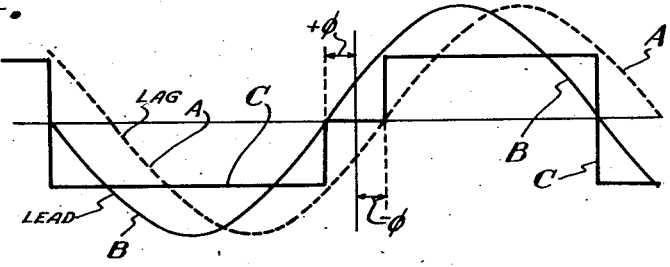
Figure 3:
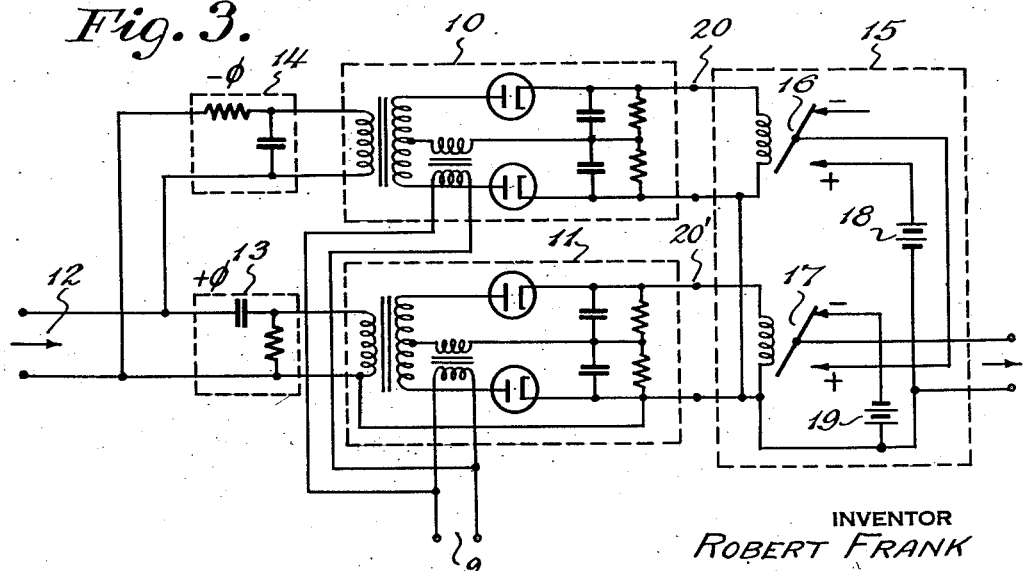
Fig. 3 is a schematic diagram of an embodiment of the present invention.

Fig. 4 comprises the operating characteristics of the embodiment of Fig. 3, and

Fig. 5 is a tabulation illustrative of the relay operation of the embodiment of Fig. 3.

Fig. 6 is a block diagram of the invention used in a fine and coarse signal data transmission system.

Phase detectors of the prior art of the sum and difference type have a characteristic which goes through zero with the same slope at both the desired zero and a false zero 180° displaced. The present invention provides a broad null of accurately defined width at the desired zero and a sharp, steep crossover at the undesired zero. The present invention thereby extends the nonambiguous region of conventional phase sensitive devices by utilizing two conventional phase detectors in parallel and combining their output polarities to resolve the 180° ambiguity. It also provides a broad accurately defined null which is desirable in certain applications.

Figure 1:
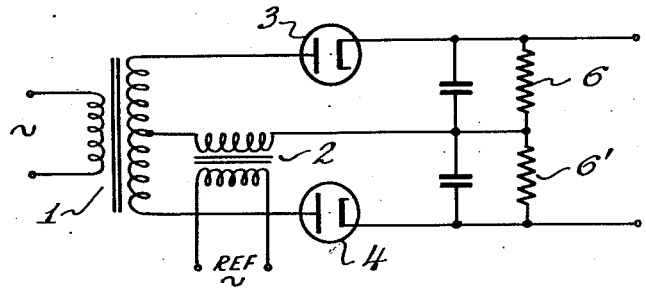
Fig. 1 is a schematic diagram of a conventional phase detector of the sum and difference type.

Fig. 1 illustrates a conventional amplitude-sensitive sum and difference type phase detector. The two voltages to be compared in phase are applied to the transformers 1 and 2.

They are added in one half of transformer 1 and subtracted in the other half, and the sum and difference outputs are rectified in diodes 3 and 4, the outputs of which are applied in opposition to the output resistors 6 and 6'.

When the two applied voltages are 90° or 270° apart in phase the rectified outputs are equal and opposite and the combined output is zero. The maximum output is obtained when the two applied voltages are in phase or 180° out of phase and in these cases the polarities of the combined outputs are opposite.

Figure 2:
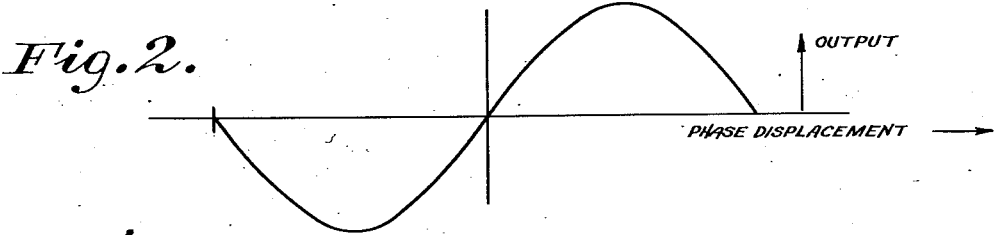
Fig. 2 is the output characteristic of the phase detector of Fig. 1.

Fig. 2 illustrates an operating characteristic curve of a conventional amplitude sensitive phase detector showing its output vs. input phase displacement. It is seen that there is an inherent ambiguity in the system as there is zero output for two conditions 180° apart, namely a 90° phase difference and a 270° phase difference. This ambiguity reduces the effective range of the conventional phase detector considerably.

The present invention provides a characteristic having a broad null at one crossover and a sharp slope at the other. This is achieved by operating two conventional phase detectors in parallel, advancing the phase of the unknown voltage in one and delaying it in equal amount in the other and comparing the respective outputs in polarity to resolve the ambiguity. This will be fully discussed in connection with Fig. 3.

Fig. 3 illustrates an embodiment of the invention and Fig. 4 illustrates its operating characteristic. The embodiment of Fig. 3 comprises in general a pair of conventional phase detectors 10 and 11 each similar to that shown in Fig. 1 and operated in parallel. The phase of the signal voltage input applied to terminals 12 is advanced in phase shifter 13 and then applied to phase detector 11. The same signal voltage is delayed in phase an equal amount by phase shifter 14 and then applied to the other phase detector 10. The reference signal is applied to terminals 9.

Referring to Fig. 4, there are shown the operating characteristics A and B of the two phase detectors 10 and 11. The lagging phase detector 10 characteristic is shown by dotted curve A and the leading phase detector 11 characteristic is shown by curve B. It is important to note that at the desired crossover point, the polarity of the leading output B is plus, and that of the lagging output A is minus. This condition does not take place at the other crossover point, but rather is the reverse. Advantage is taken of this combination of polarities to resolve the ambiguity and to provide a single broad null. This is done by combining the outputs of the two phase detectors by polarity responsive combining means 15.

The desired operating characteristics of the polarity responsive combining means 15 are as follows:

First, it is responsive to the polarities of the phase detector outputs rather than their amplitude, in order to resolve ambiguities as to the correct crossover point.

Second, it provides a broad and accurately defined width null of zero output at the correct crossover point. The null occurs when the lag output A is minus and the lead output B is plus. The null is equal in width to the total displacement of the two phase shifters.

Third, it provides opposite polarity outputs as the phase angle difference departs from this crossover point in opposite directions.

Fourth, it provides a sharp null at incorrect crossover point.

This type output characteristic is advantageous for providing a plus or minus error signal for a servomechanism or similar device.

The polarity responsive combining means 15 comprises a pair of relays 16 and 17 together with plus and minus voltage sources 18 and 19. The relays are polarized as illustrated so that when upper output terminals 20 and 20' of the phase detectors are positive the relay makes the plus contact, and when terminals 20 and 20' are negative, the relays make the minus contact. The relays are shown making the minus contact. They are of a suitable double throw type and have no neutral position. The outputs for all possible relay positions are tabulated in Fig. 5. In Fig. 5 the small plus and minus signs refer only to the polarization of the relays 16 and 17. The total output is plus or minus depending on how the output terminals are connected to the batteries 18 and 19. The minus contact of relay 16 is not connected to any circuit.

Fig. 4 shows the operating characteristics of the embodiment of 3. The sine wave B shows the characteristic of the leading phase detector 11 and the dotted sine wave A shows the characteristic of the lagging phase detector 10. The output relays 16 and 17 are responsive to the polarities of these characteristics. The relays 16 and 17 are interconnected to provide the combined output shown by the rectangular characteristic C.

The operation of the relays 16 and 17 to provide the desired output under the various conditions obtainable will now be discussed. When the phases of the input signal and reference voltages are such that the leading phase detector has a plus output and the lagging phase detector has a minus output, then the combined output will be within the broad null portion of the combined characteristic C.

When the phases of the input and reference signals are such that the leading detector has a plus output and the lagging output also has a plus output, then the combined output will have a predetermined polarity, indicated in Fig. 4 as a plus quantity to the right of the center portion.

When the phase relations of the input signal and reference voltages are such that the leading phase detector output is minus, then the combined output would have the opposite polarity, indicated in Fig. 4 as a minus output to the left of center. The combined characteristic C is not symmetrical as it is always minus when the leading detector output is minus.

The combining means 15 is not amplitude sensitive, except of course that there must be sufficient amplitude to operate the relays. The length of the null portion of the characteristic C is substantially dependent upon the total displacement, $2\phi$, of the inputs and therefore may be accurately defined.

Alternate arrangements of the apparatus of Fig. 3 may be utilized for achieving the same results, and these are deemed to be within the scope of the invention. For instance, instead of using plus and minus phase shifters 13 and 14, only one phase shifter need be used and the other connection may be made directly. Of course, this will move the output characteristic curve in phase but it will be a constant amount and may be compensated for.

Also the two phase shifters 13 and 14 may be inserted in the reference voltage input, rather than the signal voltage input as shown with the same result. Another alterative is to substitute time delay networks for the phase shifters and if the frequency is reasonably constant, this will have the same result. A single phase shifter may be substituted for the two shown and alternately switched into each channel.

The invention is also particularly well suited for use in transmission systems which utilize phase measurement and which are of the coarse and fine signal type. Systems for the transmission of angular information for driving an indicator or servomechanism of this type, utilize a low frequency to make an approximate or coarse setting, and a fine signal of high frequency for the final adjustment. The operating characteristic of the invention, that is plot C of Fig. 4, having the flat zero output at the reference point is admirably suited for use in the coarse portion of such a system. In operation, the coarse signal will rapidly drive the servo of the indicator to an approximate setting which would be within the flat center portion of the curve C. At this point the fine signal would take over and make the final fine adjustment.

Fig. 6 shows the invention utilized in a system of this type. Fig. 6 is an adaption of the omniazimuth navigation system of U. S. Patent No. 2,564,703, issued August 21, 1951, in the names of George Litchford and Joseph Lyman. The object of this system is to receive angular information and position the indicator 27, and both coarse and fine signals are provided in order to obtain greater accuracy without ambiguity. The signals are here shown by coarse and fine signal source 21 and 22, and coarse and fine reference sources 23 and 24. In a radio navigation system all of these signal sources would, of course, be in the craft radio receiver.

A coarse reference signal is supplied from source 23 to selsyn transformer 29 which phase shifts it proportionally to the angle of indicator 27. The Y connected output of selsyn phase shifter 29 is converted in combining network 28 to a simple voltage which is phase displaced from the fine reference voltage proportionally to the displacement angle of indicator 27. This output is then applied to phase detectors 10 and 11.

This phase detector combination of the present invention provides an error output, as previously discussed and illustrated by curve C of Figure 4, which will position the indicator 27 by means of amplifier 25 and motor 26.

When the indicator 27 is approximately positioned, that is within the flat portion of the output characteristic C, then there will be zero output in the coarse channel and relay 30 will connect amplifier 25 to the output of the fine channel phase detector 31 for the final adjustment. This application of the invention is only illustrative of the operation of the invention in a coarse and fine data system and other alternative schemes may be used. Details of the above circuits are shown in the above-mentioned U. S. Patent No. 2,564,703.

Thus it is seen that the present invention provides a novel combination of discriminators, which combination has an output characteristic desirable for certain applications. One of these which has been illustrated is its application to coarse phase detection in systems of the coarse and fine type.

Another advantage of the present invention is that it is largely amplitude insensitive. The relays connect a constant amplitude output regardless of the amplitude of the applied signals.

Another advantage is that the present invention provides discriminator means having a characteristic with a broad, accurately defined null.

Another advantage is that it provides means to combine conventional phase, frequency, or time discriminators so as to provide an over-all characteristic having a broad, accurately defined null.

The invention is not limited to a combination of phase detectors but may also be used with other types of discriminators, for instance, frquency discriminators or pulse time discriminators. It may be used with any pair of discriminating circuits, each having a slanting characteristic through the reference point like a frequency discriminator. The inputs to the individual discriminators are relatively displaced in some respect such as phase, frequency, or time and the separate outputs are selected as to polarity and combined so that the over-all characteristic is a steep sided one with an accurately defined null portion. Therefore, voltages within the null portion may be selected, and voltages outside the high and low limits of the null portion will be appropriately indicated.

It is intended that all matter contained in the above description shall be interpreted as illustrative, as many equivalents of the elements illustrated could be used without departing from the scope of the invention. For instance, other type discriminators such as frequency discriminators may be substituted for the phase discriminators shown. Other equivalent types of combining means may also be substituted.

What is claimed is:

1. Comparator means for producing a signal having a polarity characteristic corresponding to the phase relationship between an input signal and a reference signal comprising, means for phase shifting said input signal, means to receive said input signal and said reference signal and adapted to produce a first reversible polarity signal of a polarity depending upon the phase relationship of said two signals, means to receive said phase shifted input signal and said reference signal and adapted to produce a second reversible polarity signal of a polarity depending upon the phase relationship of said two signals, combining means including sources of equal amplitude negative and positive D. C. potentials, output terminals, and means associated with and responsive to each of said first and second reversible polarity signals for respectively connecting the D. C. potential sources to said output terminals in a polarity sense depending upon the polarity of the respective signals controlling the same, whereby as said input signal and reference signal are relatively phase shifted the D. C. potentials will produce an output wave form having its polarity correlated to the phase relationship between said input signal and said reference signal, and said wave form will include a zone of zero signal magnitude having a length determined by the amount of phase displacement introduced by said phase shift means.

2. Comparator means for producing a signal having a polarity characteristic corresponding to the phase relationship between an input signal and a reference signal comprising, means for advancing the phase of said input signal, means for retarding the phase of said input signal, means to receive said advanced input signal and said reference signal and adapted to produce a first reversible polarity signal of a polarity depending upon the phase relationship of said two signals, means to receive said retarded input signal and said reference signal and adapted to produce a second reversible polarity signal of a polarity depending upon the phase relationship of said two signals, combining means including sources of equal amplitude negative and positive D. C. potentials, output terminals, and means associated with and responsive to each of said first and second reversible polarity signals for connecting the D. C. potential sources to said output terminals in a polarity sense depending upon the polarity of the respective signal controlling the same, whereby as said input signal and reference signal are relatively phase shifted the D. C. potentials will produce an output wave form having its polarity correlated to the phase relationship between said input signal and said reference signal, and said wave form will include a zone of zero signal magnitude having a total length determined by the amount of phase displacement introduced by both said phase advancing and phase retarding means.

3. Comparator means for producing a signal having a polarity characteristic corresponding to the phase relationship between an input signal and a reference signal comprising, means for advancing the phase of said input signal, means for retarding the phase of said input by an amount equal to said phase advance, means to receive said advanced input signal and said reference signal and adapted to produce a first reversible polarity signal of a polarity depending upon the phase relationship of said two signals, means to receive said retarded input signal and said reference signal and adapted to produce a second reversible polarity signal of a polarity depending upon the phase relationship of said two signals, combining means including sources of equal amplitude negative and positive D. C. potentials, output terminals, and means associated with and responsive to each of said first and second reversible polarity signals for connecting the D. C. potential sources to said output terminals in a polarity sense depending upon the polarity of the respective signal controlling the same, whereby as said input signal and reference signal are relatively phase shifted the D. C. potentials will produce an output wave form having its polarity correlated to the phase relationship between said input signal and said reference signal, and said wave form will include a zone of zero signal magnitude having a total length determined by the amount of phase displacement introduced by both said phase advancing and phase retarding means.

4. A method of comparing the phase of an input signal to that of a reference signal comprising the steps of, displacing the phase of the input signal, detecting the phase difference between the phase displaced input signal and the reference signal, detecting the phase difference between the input signal and the reference signal, combining D. C. signals to produce an output signal, controlling the combination of component D. C. signals constituting the output signal by means of the respective detected phase differences, and combining opposite polarity component D. C. signals to produce a composite null output for a phase sector determined by the imposed phase displacement of the input signal.

5. A method of comparing the phase of an input signal to that of a reference signal comprising the steps of advancing the phase of the input signal, retarding the phase of the input signal by an equal amount, detecting the phase difference between the advanced input signal and the reference signal, detecting the phase difference between the retarded input signal and the reference signal, combining D. C. signals to produce an output signal, controlling the combination of component D. C. signals constituting the output signal by means of the respective detected phase differences, and combining opposite polarity component D. C. signals to produce a composite null output for a phase sector determined by the total imposed phase displacement between the advanced and retarded input signal.

6. In a servomotor control system comprising a motor, a control amplifier therefor, and fine and coarse reversible phase A. C. error signal sources providing fine and coarse measures of the error existing in said system, a device for eliminating the coarse error signal for a predetermined phase sector each side of the point of synchronism of said system, said device comprising a pair of phase shifters for producing a first coarse signal advanced in phase and a second coarse signal retarded in phase, a pair of phase detectors to which said signals are respectively applied, a source of fixed phase A. C. reference voltage connected to energize both said phase detectors, each phase detector comprising a pair of balanced diode circuits for providing a differential output of a polarity reversing with reversals in phase of the coarse error signal, sources of opposite polarity fixed amplitude D. C. potentials, means responsive to said reversible polarity signal to selectively combine said fixed amplitude D. C. potentials in a composite signal having components corresponding to the respective polarities of said phase detector outputs, whereby opposite polarity D. C. potentials are combined to cancel the output representing said coarse error signal for values of coarse error signals determined by the net phase displacement between said advanced and retarded coarse input signal about said synchronization point.

References Cited in the file of this patent

UNITED STATES PATENTS

| | | |
|---|---|---|
| 2,410,843 | Shepherd | Nov. 12, 1946 |
| 2,411,876 | Hansen | Dec. 3, 1946 |
| 2,411,916 | Woodyard | Dec. 3, 1946 |
| 2,423,229 | Crosby | July 1, 1947 |
| 2,467,361 | Blewett | Apr. 12, 1949 |
| 2,541,454 | White | Feb. 13, 1951 |
| 2,562,329 | O'Brien | July 31, 1951 |
| 2,595,675 | Jaynes | May 6, 1952 |